United States Patent Office 3,427,184
Patented Feb. 11, 1969

3,427,184
METHOD FOR COATING POLYOLEFIN FILMS AND COATED ARTICLES
Jean B. Mauro, New Haven, and Lamont Hagan, Guilford, Conn., assignors to National Distillers and Chemical Corporation, New York, N.Y., a corporation of Virginia
No Drawing. Filed June 28, 1965, Ser. No. 467,715
U.S. Cl. 117—76                                6 Claims
Int. Cl. B44d 1/22, 1/092

ABSTRACT OF THE DISCLOSURE

A method for coating a polyolefin film with a vapor-impermeable vinylidene chloride interpolymer which comprises applying an aqueous, alkaline coating composition comprising a co-polymer of a vinyl ester of an aliphatic saturated monocarboxylic acid having from one to four carbon atoms and an unsaturated monocarboxylic acid component having the formula:

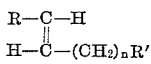

to form a primer coat on the polyolefin film, drying the primer coating composition at a temperature above 90° F., applying an aqueous emulsion containing an interpolymer of vinylidene chloride on the primer coat and drying the vinylidene chloride polymer-containing coating at a temperature greater than that utilized to dry the primer coat. The primer coat thus consists essentially of the described co-polymer in amounts from 0.1 to 10 grams per 1000 square inches of the coated film surface area. The final drying step coalesces the emulsion and forms a continuous film of the vinylidene chloride interpolymer. R, $n$, R' and R'' are defined in the specification. A coated polyethylene film having a vapor-impermeable vinylidene chloride interpolymer-containing coating adhered thereto by means of the above-described primer coat is also disclosed. The primer coat is formed of the materials described above.

---

This invention relates to a method for coating polyolefin films with vapor-impermeable vinylidene chloride interpolymer-containing coatings. More particularly, the invention pertains to the application, from aqueous media, of primer coats for adhering such vinylidene chloride interpolymers to base films, and to the resulting articles.

In the following specification, all parts and percentages are by weight unless otherwise indicated.

Interpolymers of vinylidene chloride, which are commercially available under the trademark "Saran," for example, have been employed in coatings for various films to impart fluid impermeability thereto. Thus, regenerated cellulose films having such interpolymer-containing coatings have been utilized for wrapping a wide variety of commodities; in the case of foodstuffs it has been found that the use of such coated films improves flavor and odor retention characteristics of the base film.

It is desirable to provide such coatings on polyolefin film bases since such bases, while effective moisture barriers, are not vapor impermeable. However, vinylidene chloride interpolymer-containing coatings of the type here involved do not readily adhere to polyethylene or polypropylene films, for example, whether or not such films are subjected to conventional electrical discharge pretreatment. To adhere such coatings to polyolefin substrates, it is necessary to utilize primer coatings designed to adhere to both the polyolefin base film and the vinylidene chloride coating therefor.

A number of procedures have heretofore been proposed for applying such primer coats from solvent-based coating media. One such method is described in Gilbert et al.

U.S. Patent No. 3,111,418 of Nov. 19, 1963, wherein a polyethylene imine or organic titanium compound is disclosed as the base for a suitable primer. Use of this and other solvent-based procedures is, however, subject to the usual disadvantages inherent in solvent operations; viz., the inherent expense of solvent losses, of solvent recovery operations and safety procedures, the explosion hazards, and the like. Prior to the present invention, no aqueous coating media for applying primer coatings facilitating the adhesion of vinylidene chloride interpolymers to olefin film substrates were known.

It is accordingly among the objects of the present invention to provide a method for applying a vapor-impermeable vinylidene chloride interpolymer-containing coating to a polyolefin film base employing a primer coating deposited from an aqueous medium.

A further object of the invention is to provide such a method which does not involve the inherent expenses and hazards involved in the use of solvent-based primer coatings.

Yet an additional object of the invention is to provide coated polyolefin films produced by such method, which films can be utilized to produce excellent heat seal characteristics.

Other objects and advantages of the present invention will be apparent from consideration of the following description of preferred embodiments thereof.

In accordance with the invention a vapor-impermeable vinylidene chloride interpolymer coating may be adhered to a polyolefin film base by initially applying to the polyolefin film to form a primer coat thereon, an aqueous coating composition incorporating a copolymer of (1) a vinyl ester of an aliphatic saturated monocarboxylic acid having from 1 to 4 carbon atoms, and (2) an unsaturated monocarboxylic acid component having the formula:

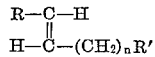

wherein R is hydrogen or methyl, $n$ is an integer of from 0 to 2, R' is —COOH, —CN or —COOR'', and R'' is methyl, ethyl or propyl. It has been found that the use of such a water-base primer coating composition decreases both the expense and hazard of coating the polyolefin substrate and yet provides a permanently coated polyolefin film capable of producing high heat seal strengths and other desirable film characteristics.

The polyolefin base films to be coated may be constituted of polyethylene, polypropylene or suitable laminates thereof. One such laminate, which may be coated in accordance with the practice of the present invention, comprises a polypropylene core laminated on its opposite faces to polyethylene skins which, together, comprise about 15% of the thickness of the substrate laminate. It will be understood that such polyolefin film bases are pretreated prior to the application of the primer coating of this invention in the conventional manner, e.g., by electrical discharge, to provide improved adhesion characteristics. Moreover, the polyolefin substrate to be primed should not contain any slip agents, and should be free of other materials which would interfere with adhesion of the primer coat thereto.

The aqueous coating composition employed in the practice of the invention consists essentially of a solution of the above-identified copolymeric material in an alkaline solution having a pH no lower than 9, the alkaline material being added thereto to insure solubility of the copolymer. Desirably, the coating composition comprises an ammoniacal solution containing from 1 to 25% by weight ammonia, computed on a 28° Bé. basis. The use of ammonia as the alkaline additive is preferred inasmuch as no alkaline residue, which might deleteriously react with the vinylidene chloride interpolymer coating, remains on the polyolefin substrate when such an ammonia-containing primer coating is dried. However, other alkaline materials such as the organic amines and, less preferably, sodium hydroxide or sodium carbonate may also be utilized, depending upon whether the alkaline material in question leaves a residue on the film base, and whether such residue deleteriously reacts with the subsequently applied vapor-impermeable coating.

The aqueous coating composition has a solids concentration of from about 5 to 25%, preferably from about 10 to 20%, by weight thereof. The solids consist essentially of the class of copolymeric materials identified above which are, in turn, prepared by reaction of the indicated vinyl ester and carboxylic acid components in the proportion of from about 85 to 98 parts of the vinyl ester monomer for each 15 to 2 parts of the acid component.

The vinyl ester component of the primer coat may be an ester of any of the aliphatic saturated monocarboxylic acids having from one to four carbon atoms, e.g., vinyl formate, vinyl acetate, vinyl propionate, or vinyl butyrate. Monomers which may be utilized for the unsaturated monocarboxylic acid component of the primer copolymer include, for example, crotonic acid (trans-2-butenoic acid) and/or one of its derivatives, e.g., a corresponding ester such as methyl crotonate, ethyl crotonate or propyl crotonate, or crotonitrile; acrylic acid, pentenic acid (trans-2-pentenoic acid); or hexenic acid (trans-2-hexenoic acid).

Preferably, the primer coat is constituted of an aqueous ammoniacal solution having a solids concentration of from about 10 to 20%, which solids consist essentially of a copolymer of vinyl acetate and crotonic acid. The use of such a primer coating has been found to provide particularly outstanding adhesion between the polyolefin film base and the vinylidene chloride interpolymer-containing, vapor-impermeable coatings applied thereto.

The primer coat is applied to the polyolefin film base by any suitable conventional operations, including dipping, doctoring, spraying, gravure coating, or the like, to form a continuous coat superimposed upon the base film. The coating composition may be applied over a wide range of temperatures, temperatures from room temperature (20° C.) up to the boiling point of the composition (about 90° C.) having been successfully utilized.

The primer coat is dried to form a continuous layer or film, the thickness of which is such that from as little as 0.1 gram to as much as 10 grams of the copolymeric coating are uniformly spread over 1000 square inches of the polyolefin film base. Preferably, film thicknesses equivalent to 0.5 to 2 grams of copolymer per 1000 square inches of substrate are employed. The drying operation is conducted at temperatures in excess of about 90° F., up to the maximum temperature which the polyolefin base can withstand. Adequate drying has been effected utilizing drying temperatures varying from 90° to as much as 300° F., preferably from about 125° to 200° F.

There is thus produced a coated polyolefin film which will be readily bonded to a vinylidene chloride interpolymer coating and which, when so treated, will display excellent appearance and form strong heat seals.

The vinylidene chloride interpolymers referred to herein include any polymeric materials containing from about 70% to 95%, and, preferably, from about 80% to 92%, vinylidene chloride, and correspondingly from about 30% to 5% and, preferably, from about 20% to 8%, of one or more monomers copolymerizable therewith. Copolymerizable monomers so useful include vinyl chloride, acrylonitrile, acrylic acid esters, methacrylic acid esters, maleic acid esters, fumaric acid esters, itaconic acid esters, the alcohol constituents of these esters containing 1–6 carbon atoms and preferably not more than 4 carbon atoms; there may also be used methylvinyl ketone, vinyl acetate and other vinyl esters, styrene, dichlorovinylidene fluoride, butadiene, chlorobutadiene, isoprene or vinylpyridine.

The vinylidene chloride interpolymer is suitably applied in emulsion form to the dry vinyl-ester-unsaturated monocarboxylic acid copolymer primer coat, produced in accordance herewith. Such emulsion may additionally contain other additives frequently incorporated in vinylidene chloride coatings. Known anti-blocking agents, e.g., polyethylene, carnauba wax, aluminum silicate, or the like; anti-fogging agents; or anti-static agents may thus be included in the vinylidene chloride interpolymer-containing coating emulsion.

The vinylidene chloride coating is thereafter dried and adhered to the underlying primed polyolefin substrate by heating the coating at suitable temperatures. The drying temperatures thus employed are higher than those utilized to effect drying of the primer coat hereof, inasmuch as the final drying operation must effect coalescence of the emulsion and the underlying primer, and thereby avoid distortion of the coated polyolefin film. Such drying operation is carried out at temperatures varying from at least 150° F. to as high as 300° F., and preferably at temperatures of from about 185° to 225° F.

The preferred conditions for carrying out the method, and producing the products, of the present invention are illustrated in the following examples, which describe preferred embodiments thereof.

Example I

An aqueous solution of 4 parts of 26° Bé. ammonia in 81 parts of water was added to a vessel equipped with a stirrer. To the solution, with moderate stirring, was slowly added 15 parts of a vinyl acetate-crotonic acid copolymer (prepared from a monomeric mixture containing about 90 parts vinyl acetate and 10 parts crotonic acid). The resin-containing mixture was stirred at room temperature until the resin was dissolved. The resulting solution was then coated on a corona-treated composite polyolefin film laminate, consisting of a core of polypropylene with a skin from 0.0001 to 0.0003 inch thick low density polyethylene on opposite sides thereof. The composite film contained no slip or other additive materials.

The primer coat was dried by heating the primed substrate at 75° C. for a period of 0.5 minute, and a coating of a polyvinylidene chloride polymer emulsion (a "Daran" polymer commercially available from the Dewey and Almy Division of W. R. Grace and Co.) thereafter applied thereto. The polyvinylidene chloride polymer coating was dried by heating the coated substrate at a temperature of 90° C. for 0.5 minute.

It was found by examination of the composite film thus produced that the polyvinylidene chloride polymer was adhered so tightly to the primed polypropylene-polyethylene substrate that such coating could not be peeled off the substrate by mechanical means.

Example II

The procedure described in Example I was repeated, incorporating 5% of an aluminum silicate pigment (having an average particle size of from 1 to 5 microns) in the polyvinylidene chloride polymer emulsion, prior to coating with the same. It was found that such material, which served as an anti-blocking agent (a material reducing the tendency of adjacent layers of the coated film to stick to one another when wound in rolls) had no adverse effect on the interlayer adhesion of the coated film.

Example III 20 parts of the vinyl acetate-crotonic acid copolymer utilized in Example I was slowly added to a solution containing 4 parts of 26° Bé. ammonia in 76 parts of water. The mixture was stirred at room temperature until the resin dissolved therein. The coating composition thus prepared was coated on a corona-treated polypropylene substrate having a density of approximately 0.097 gram/cc. and containing no slip or other additives. The vinyl acetate-crotonic acid primer coat was then dried and top-coated with a polyvinylidene chloride polymer emulsion, and the latter dried, as more fully described in Example I. It was found that the composite film thus produced exhibited similar interlayer adhesion characteristics to those of the product of Example I.

Example IV 10 parts of the vinyl acetate-crotonic acid copolymer resin used in Example I was slowly added to a solution of 4 parts of 26° Bé. ammonia in 26 parts of water. The mixture was stirred at room temperature until the resinous material dissolved. The resulting solution was coated on a corona-treated polyethylene film base having a density of approximately 0.925 gram/cc. and containing no slip or other additives. The prime coat was thereafter dried and coated with a polyvinylidene chloride polymer emulsion in the manner described above. It was found that the film thus produced possessed similar interlayer adhesion characteristics to those exhibited by the coated film produced in the foregoing examples.

It will be apparent that, in accordance with the present invention, vinylidene chloride interpolymer coatings may be firmly adhered to polyolefin film substrates, employing novel water-base primer coatings.

What is claimed is:
1. A method for coating a polyolefin film with a vapor-impermeable vinylidene chloride interpolymer, which comprises:
  (a) applying to said polyolefin film for the formation of a primer coat thereon, an aqueous, alkaline coating composition consisting essentially of a co-polymer of (1) a vinyl ester of an aliphatic saturated monocarboxylic acid having from one to four carbon atoms and (2) an acid component having the formula:

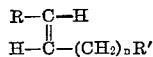

wherein R is selected from the group consisting of hydrogen and methyl, $n$ is an integer of from 0 to 2, R' is selected from the group consisting of —COOH, —CN and —COOR'', and R'' is selected from the group consisting of methyl, ethyl and propyl, said co-polymer being produced by the reaction of from about 85 to about 98 parts by weight vinyl ester per about each 15 to 2 parts unsaturated acid component;
  (b) drying said coating composition at temperatures in excess of about 90° F. to form a continuous primer coat on said polyolefin film, said primer coat consisting essentially of said co-polymer in an amount of from 0.1 to 10 grams per 1000 square inches of the film surface area;
  (c) applying an aqueous emulsion containing an interpolymer of vinylidene chloride, the interpolymer containing from about 70% to about 95% vinylidene chloride, atop said primer coat; and
  (d) drying the vinylidene chloride polymer-containing emulsion at temperatures in excess of those employed in Step (b) hereof, to coalesce said emulsion and form a continuous film of the vinylidene chloride interpolymer on the polyolefin film base.

2. The method as defined in claim 1, in which said aqueous, alkaline coating composition consists essentially of an ammoniacal solution of a vinyl acetate-crotonic acid copolymer in an amount of from 5 to 25% by weight of the solution, said copolymer resulting from the reaction of from 85 to 98 parts by weight vinyl acetate per each 15 to 2 parts by weight crotonic acid.

3. A polyolefin film having a vapor-impermeable vinylidene chloride interpolymer-containing coating adhered thereto, which comprises:
  (a) a polyolefin film base;
  (b) a primer coat adhered to and superimposed on said film base, said primer coat consisting essentially of a co-polymer of (1) a vinyl ester of an aliphatic saturated monocarboxylic acid having from 1 to 4 carbon atoms, and (2) an acid component having the formula:

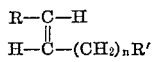

wherein R is selected from the group consisting of hydrogen and methyl, $n$ is an integer of from 0 to 2, R' is selected from the group consisting of —COOH, —CN and —COOR'', and R'' is selected from the group consisting of methyl, ethyl and propyl, said co-polymer being produced by the reaction of from about 85 to about 98 parts by weight vinyl ester per about each 15 to 2 parts unsaturated acid component; and
  (c) a vinylidene chloride interpolymer-containing coating, the vinylidene chloride interpolymer containing from about 70% to about 95% vinylidene chloride, adhered to and superimposed on said primer coat, the interpolymer-containing coating being thereby adhered to the polyolefin film base.

4. The coated polyolefin film of claim 3, in which said film base is selected from the group consisting of polyethylene, polypropylene, and a polyethylene-polypropylene laminate.

5. The coated polyolefin film of claim 3, in which said vinyl ester is vinyl acetate and said acid component is crotonic acid.

6. A coated polyethylene film having a vapor-impermeable vinylidene chloride interpolymer-containing coating adhered thereto, which comprises:
  (a) a polyethylene film base;
  (b) a primer coat adhered to and superimposed on said film base, said primer coat consisting essentially of a co-polymer of vinyl acetate and crotonic acid produced by reaction of from 85 to 98 parts by weight vinyl acetate per each 15 to 2 parts by weight crotonic acid and having a thickness such that from 0.1 to 10 grams of said co-polymer are coated substantially uniformly over each 1000 square inches of the polyethylene film base surface; and
  (c) a vinylidene chloride interpolymer-containing coating, the vinylidene chloride interpolymer containing from about 70% to about 95% vinylidene chloride, adhered to and superimposed on said primer coat, the interpolymer-containing coating being thereby adhered to the polyolefin film base.

References Cited

UNITED STATES PATENTS 3,088,844   5/1963   Hungerford et al.
3,219,475   11/1965  Dixler.

FOREIGN PATENTS 1,360,178   3/1964   France.

WILLIAM D. MARTIN, *Primary Examiner.*

R. HUSACK, *Assistant Examiner.*

U.S. Cl. X.R.

117—138.8, 161, 122